United States Patent [19]

Wolf

[11] Patent Number: 4,584,791
[45] Date of Patent: Apr. 29, 1986

[54] SOILESS AGRICULTURAL SYSTEM AND COMPONENTS THEREFORE

[75] Inventor: Rodney A. Wolf, Amherst Junction, Wis.

[73] Assignee: Brandon Woods Associates, Chicago, Ill.

[21] Appl. No.: 646,373

[22] Filed: Aug. 29, 1984

[51] Int. Cl.⁴ .............................................. B01J 3/00
[52] U.S. Cl. ........................................ 47/62; 47/79; 47/48.5
[58] Field of Search ...................... 47/66, 79, 48.5, 59, 47/60, 61, 62, 63, 64, 65, 86

[56] References Cited

U.S. PATENT DOCUMENTS

3,660,933 5/1972 Wong, Jr. ............................... 47/62
4,118,891 10/1978 Kehl et al. .............................. 47/59

Primary Examiner—Robert A. Hafer
Assistant Examiner—Bradley M. Lewis
Attorney, Agent, or Firm—Niblack & Niblack

[57] ABSTRACT

A soilless agricultural system and components therefore including a hydroponic assembly comprising support means for defining a crop field, nutrient solution circulating system and a plant tray assembly having a seedling or plant tray cooperating with a support tray.

11 Claims, 18 Drawing Figures

SOILESS AGRICULTURAL SYSTEM AND COMPONENTS THEREFORE

BACKGROUND OF THE INVENTION

It has been known for many years that plants can be grown without natural soil by substituting a direct source of nutrients. The term "hydroponics" has been coined to describe a variety of soilless culture systems. The basic concept in hydroponics is to feed chemical nutrients, i.e. nitrogen, potassium, calcium, etc., directly to the plant's roots through the vehicle of an aqueous solution.

Hydroponic techniques have been used in the laboratory for decades to achieve precise control of growth variables for scientific study. In recent years, several products have been developed to enable both private and commercial growers to utilize hydroponic principles. When hydroponic equipment and supplies are low enough in cost, carefully controlled hydroponic culture has significant economic advantages over conventional soil culture: plant nutrition is easily optimized; soilborne diseases are eliminated; there are no weeds to deal with; and the yield and quality is more predictable and generally of better quality. Overall, this means significantly greater yield per square foot of growing area.

Hydroponic culture is usually coupled with greenhouse facilities in an effort to achieve maximum control of growth factors (temperature, light, humidity, nutrients, and water.) The art may be divided into two basic categories, open systems and closed systems. In open systems the nutrient solution fed to the plants is not retrieved but, rather, leaches and drains away. Fresh nuturents are continually supplied and, with the use of "nutrient concentrate injectors" (mechanisms for supplying nutrients to a water irrigation system on a continual basis), can be regulated with great precision to the plant's growth needs. Closed systems retain the nutrient solution for reuse. The solution is pumped from a reservoir to the plants where it wets the roots through one mechanism or another, and is ultimately returned to the reservoir. The "batch" solution is generally used for a one to four week period, and then discarded and replaced with a fresh batch. In both open and closed systems the nutrient solution is usually applied intermittently. This is done to insure that the roots receive an adequate amount of oxygen.

Open systems have, to date, been the most commonly used hydroponic method. They are admittedly very inefficient in their nutrient usage, in that a great deal of good nutrients are lost. But they are relatively simple mechanically, and have been very practical.

Closed systems offer potentially greater efficiency of nutrient usage and lower cost per yield. Achieving this efficiency, and consequent profitablity, in practice depends largely on the cost and practical design of the supporting equipment.

A wide variety of closed system structures and techniques have already been developed. In some, inert media are used for plant support. Such media incude gravel, sand, sawdust, vermiculite, and even synthetic plastic materials. These media have no nutrient value themselves, but merely serve as a "housing" for the plant roots and a temporary "sponge" to keep the plant roots in contact with the nutrient solution as well as with oxygen. A medium is not essential, however. One of the most successful techniques, called Nutrient Film Technique (NFT), supports plants single file along a trough and trickles nutrient solution along past the roots. Actually, the roots usually tend to form a rather dense mass that retains solution nicely while permitting oxygenation. Another technique, often called "aeroponics," suspends the plant roots freely in air, and mists them with a sprayed nutrient solution.

While many of these techniques have been successfully used by commercial and private growers, there are several disadvantages and inefficiencies which have not been overcome by the prior art. A major shortcoming of most prior art systems is the high proportion of manual labor costs. Even though the hydroponic system itself eliminates several manual operations necessary in conventional culture, the set-up, planting, plant maintenance, and harvesting are stll very labor intensive, and hence costly. Automation of these functions could result in significantly increased profitablity, but presently available techniques cannot readily be adapted to automation.

Techniques that utilize a medium which may be considered essential for root crops suffer from a number of problems. Adequate drainage can be difficult to achieve. Inefficient drainage can cause oxygen starvation and promote rotting. Initial cost of covering a large area with special media can amount to a substantial sum. That is especially evident when considering that the media must either be replaced for each crop or cleaned and sterilized. If the media is reused, sterilization adds to the cost. Build up of fine root hairs in reused media will eventually require its replacement. Some media have natural contaminants which must be dealt with before or during use. Others require physical attention, such as the sharp edges on gravel that can cut or injure plants. A generally ignored drawback to most media is their weight, which, if the medium is kept partly fluid, tends to bouy plant roots up to the surface.

In mediumless systems, and even in those using a medium, the thick mat of maturing roots can often impede proper drainage. This problem is commonly encountered in NFT. The roots can also grow into, and clog mechanical drainage ports and pathways to the detriment of proper drainage.

Prior to the present invention, an economical means of applying equal nutrient flow to all plants in a system remained an unsolved problem of the prior art. One of the closest approaches to solving this problem is trickle irrigation wherein individual feeder tubes run to each plant. However, the prior art trickle irrigation techniques often cause incomplete or nonsymmetrical nutrition because the flow is not easily focused toward the plant's center. In practice, these techniques have been clumsy to work with, since feed lines are easily knocked out of alignment by workers.

The present invention provides an improved soilless culture system which has a number of advantages over prior art systems and structures.

While the system is suited to manual operation, it is designed for automation with all of the primary functions, i.e. seedling transplant, nutrient supply, tissue sampling, foliar spraying and harvesting which can be readily accomplished with a robot tractor device. Automation permits the growth bed to be more densely arranged, permitting greater utilization of greenhouse space.

The seedling holder trays of the present invention permit faster transplant and reduce transplant shock more than any existing system. Growing seedlings in a separate chamber, more densely spaced, permits better time utilization of the main growing system.

Further, the system of the present invention can be used with or without a medium. When a medium is used, such as for a root crop, the system still benefits from advantages previously found only in mediumless systems. The initial supply cost is relatively low, since very little medium is needed, and no sterilization problems or root fiber build up need be considered because the medium can be economically discarded at the end of each growing cycle. If reuse of the medium is desired, the material flow process of this system affords a very simple cleansing procedure.

The present invention permits the use of very lightweight media, including lighter-than-water media. In conventional systems, small granular media with specific gravities much lower than 1.0 either cannot be used or must be mixed with a heavy medium because of the obvious problem of flotation. In the soilless culture system of the present invention, the medium is never completely immersed in water, eliminating problems of buoyancy and washing away of light medium.

The present invention achieves equal and individualized plant feeding at minimal cost and without the clumsiness of loose, individual feeder tubes. Individualized feeding has several advantages. It tends to minimize disease spread; it can permit maximum uniformity of plant growth; and, in this case, it totally eliminates problems of root aeration.

Further, the closed system of the present invention achieves a near theoretical minimum of water and nutrient consumption and requires a relatively small solution reservoir because the plant roots need not be flooded. They require only a trickle of liquid and the precise focusing of the solution on the plant's center minimizes the trickle required.

SUMMARY OF THE INVENTION

The present invention provides a modular, individualized soilless culture system capable of having automated procedures and equipment applied to it. A closed nutrient solution flow system is employed. The hydroponic field and system is suspended by spaced-apart suspending poles set in base material which carry a plurality of substantially parallel paired bars perpendicularly mounted on said poles to form a substantially horizontal plane; brackets vertically mounted between said bars and in parallel relationship to each other; nutrient solution conduit tubes located above and supported by said bars, said tubes communicating with a circulating solution source, and terminating in spray tubes having an orifice for release of said solution, said spray tubes supported on said brackets; a plant support tray suspended on the spray tubes and interruptedly channelled to expose spray tube orifices located along the tube length, said tray having a floor positioned to receive solution emitted by the spray tubes, said tray floor carrying a plurality of openings adapted to carry liquid-porous root sacks extending therebelow; a flume channel located below said tray and substantially coextensive in length thereto positioned to receive solution released from said root sacks and carry the solution to a central flume whereby the solution is returned to the circulating source; and a central solution reservoir to receive solution draining from the central flume, said reservoir having a circulating solution communication with said spray tubes.

A unique tray assembly which houses plants during their development comprises: support means suspending the tray assembly above base level; a support tray having a substantially straight upstanding channel traversing a horizontal dimension of the tray; orifices in the tray adapted to receive plant roots, and said tray suspended on the support means; a plant tray nested on said support tray having pockets, each of said pockets having an open bottom defined by a retaining ring adpated to hold a plant, the plant tray having an upstanding channel traversing a width of the tray and a concave surface adapted to directing liquid contacting the tray into the pockets, said pockets and said channel with the channel and the orifices of the support tray.

The support assembly of the present invention can be used to incorporate an alternate rail track grid upon which an automated robot tractor having flanged wheels can be operated. The robot tractor can perform all necessary planting, cultivating and harvesting tasks.

BRIEF DESCRIPTION OF THE DRAWINGS

The present invention will be more fully understood by reference to the written description, taken in conjunction with the following drawings in which.

DETAILED DESCRIPTION OF PREFERRED EMBODIMENTS

Figures 1, 2A, 3, 4A, 4B, 4C, 4D:
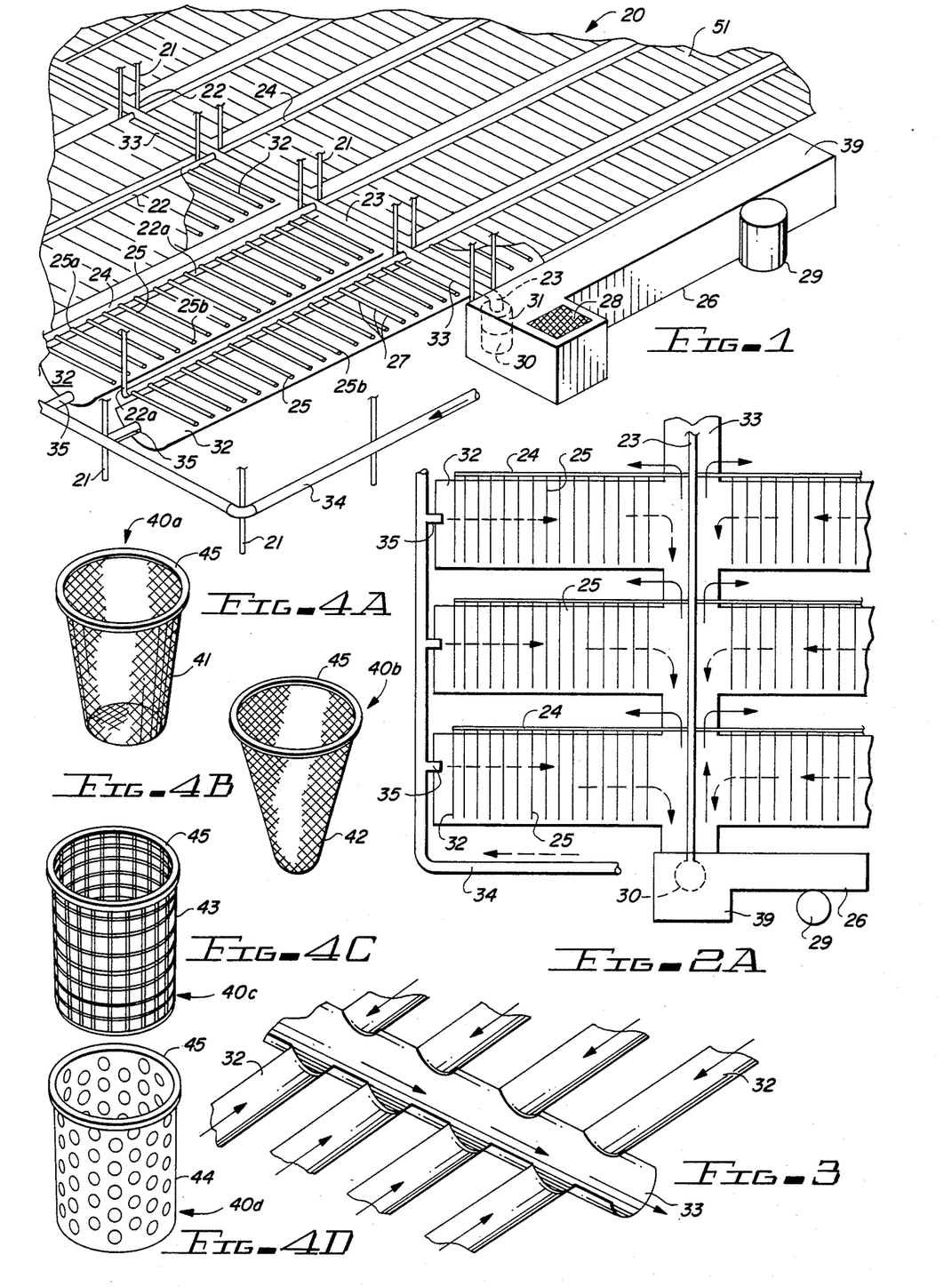
FIG. 1 is a perspective view of a hydroponic field with portions cut away for clarity and understanding.
FIG. 2A is a partial top plan view of the system.
FIG. 3 is a schematic perspective partial view of trough or flume nutrient solution return arrangement.
FIGS. 4A-4D are perspective views of plant root crop sacks or cups with varying degrees and types of liquid porosity.

Referring to the drawings, FIG. 1 depicts one preferred embodiment of the hydroponic assembly 20. Vertical suspending poles 21 are set at regularly spaced intervals in the ground base to define a crop bed. Fixed to either side of the poles are bracket pairs 22 and 22a which are set at a uniform, predetermined height to establish a horizontal support plane. An array of support bars 37 (FIG. 2B) are vertically spaced on and supported by the brackets in parallel relationship to each other. Thus the support assemblies have an overall ladder configuration which is horizontally attached to the suspending poles.

A nutrient solution circulating system which supplies needs of the plants being grown is formed by reservoir 26 attached to chemical injector 29 and containing nutrient medium 39. Pump 30 located within the reservoir is associated with final filter 31 and attached to main header 23 which in turn communicates with subheaders 24 which are fixed to spray tubes 25 by end collars 25a, completing the nutrient solution primary conduit system. The spray tubes 25 have at least one and preferably multiple spray outlets 27 along their length with cap ends 25b.

An ancillary harvest flood tube 34 terminating in stubs 35 separately carries non-nutrient water to the assembly as will be described in detail hereinbelow.

Flexible solution impervious film strips from return troughs or flumes 32 located below, substantially coextensive in width with the plant trays and adapted to receive solution descending from spray tube 25 and through plant trays 51. From these troughs, the solution collects in main trough 33 for return to reservoir 39 preferably through intake filter 28. While in a preferred embodiment, troughs or flumes are substantially coextensive in width with the plant trays, it is only necessary that the troughs be coextensive with the plant-receiving apertures or ports in the trays.

While positive pressure is employed to deliver the nutrient solution and harvest flood water to the troughs, gravity return or sloping of the trough assembly is used thereafter. As shown best by FIG. 2A, the liquid flow through the system progresses either from reservoir 26 through pump 30 along main header 23, branching out into subheaders 24 and discharged by spray tubes 25 descends into return trough 32 and then to a central trough 33 for return to the reservoir; or alternatively, harvest flood water from flood tube 34 is discharged through flood stubs 35 into the troughs to wash plant product into the central trough.

Referring to FIG. 3, the declined flume arrangement of the return troughs causes liquid discharge into the main or central trough 33.

Figure 2B:
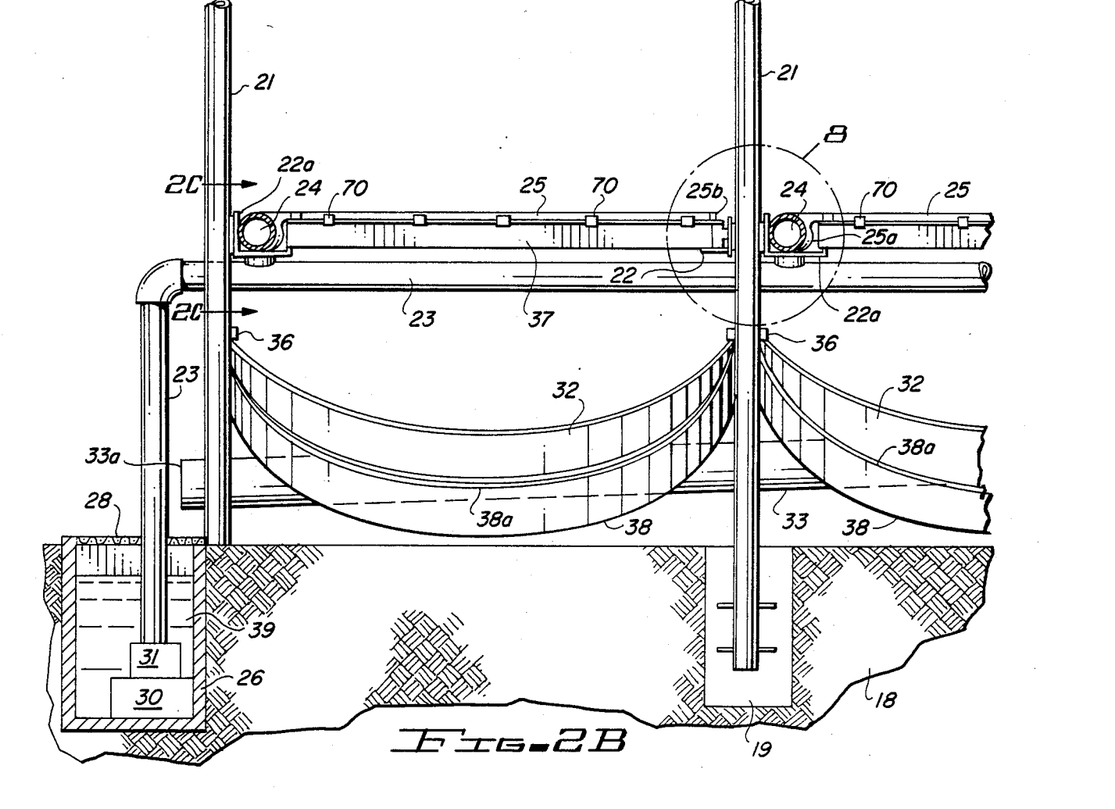
FIG. 2B is an elevational view of a partial side view of a segment of the assembly with some parts cut away for clarity and understanding and others shown in cross-section.

FIG. 2B best shows the details of the preferred support system. Feeder tube support bar 37 is horizontaly positioned between support bar brackets 22 and 22a. Cradles 70 on the bar nest feeder or spray tube 25 which is closed by end cap 25b. Also fixed to suspension pole 21 are trough support members 36. Preferably these are support strips in a parallel network that are equipped with small hooks. When this method of suspension is used, the troughs 32 are equipped with a series of grommets along each side that match the hook arrangement. Preferably the troughs are fabricated from polyethylene, butylite, waterproofed fabric or similar materials and are cut to a width such that when they are supported by their edges in functional placement within the system, they form a quarter round. This degree of droop is sufficient to ensure conduction of flood water or nutrient solution at widely differing rates.

Friction clamping and equivalent expedients may be used to support the troughs.

If desired, an air or fluid duct can be formed by suspending a second trough or air duct strip 38 directly below the trough 32. This can efficiently be suspended in the same manner and from the same support members 36. Air duct strips should be slightly wider than trough 32 so that when trough 32 and air duct strip or second trough 38 are attached at common points, trough 38 bags or droops below trough 32 to form an open duct 38a therebetween along the central portion of the length in cooperation with the less pronounced arcuate bow of trough 32. Trough 32 is set at a substantially horizontal or preferably declined level to channel liquid or harvest materials into central trough 33.

Suspension poles 21 are anchored into base support 18 preferably by being set into pile 19.

Continuing in FIG. 2B, the initial part of the nutrient solution supply system is shown in cutaway view. Pump 30 is located within reservoir 26 with filter 31 placed before main header 23 to supply nutrient medium 39 to the system. Recirculated liquid medium descends throughout the system to main trough 33 to be discharged by outlet 33a to pass through intake filter 28 back to the medium reservoir.

Figure 2C:
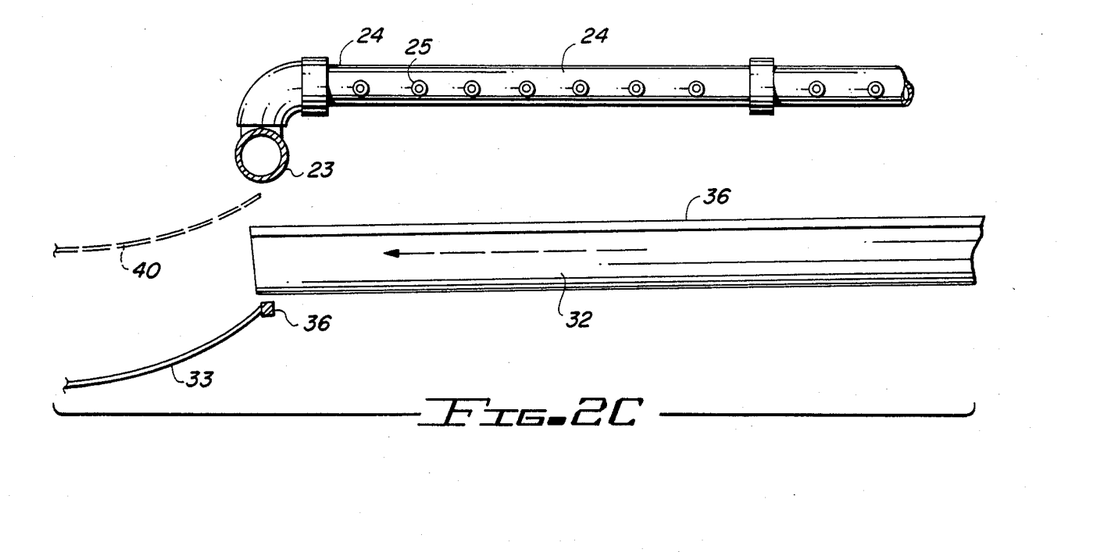
FIG. 2C is an enlarged section view taken substantially along lines 2C—2C of FIG. 2B.

FIG. 2C depicts in greater detail main header 23 communicating with subheader 24 which in turn is branched by feeder tubes 25 interspacially extending in substantially parallel relationship to each other along one side of the subheader. The tubes exude liquid spray or drip to plant trays positioned below them (not shown in FIG. 2C), with the liquid descending therethrough to be gravity collected in return trough 32 where it falls to be collected in central trough 33.

Referring to FIG. 3, over the typical crop field having a series of subheaders and spray tube arrays, troughs are positioned below each to catch the nutrient solution or harvest flood water circulating through the system and channel it to central or main trough 33 for return to the reservoir.

Roots cups 40 of preferred configurations are shown in FIGS. 4A, 4B, 4C and 4D. In FIG. 4A, cup 40a having an elongated woven cloth body 41 with a flat bottom is shown. Annular support lip 45 forms the top circumference of the cup. This type of cup or basket can be formed from plastic, cloth mesh, woven metal wire or the like. FIG. 2B shows a cup 40b of similar construction having a frusto-conical shaped-body 42 which is useful for supporting roots of lesser size or density than the flat bottom configuration. FIG. 4C illustrates a cylindrical root crop cup 40c with mesh body 43 which can be conveniently fabricated from rust resistent wire as well as plastic or water resistant paper. Because the cups are disposible, it is advantageous to form them from inexpensive, easily disposable and preferably biodegradable materials rather than stainless steel wire. FIG. 4D illustrates a cup 40d having a foraminous sheet cylindrical body 44 which is highly suited to supporting root crops. This type of cup can be formed from sheet material perforated to allow drainage, root escape if desired and adequate aeration while giving high support.

The root cups are normally employed with root crops, but are not needed in most cases unless a medium requiring confinement or additional root support is desired. While a plastic mesh is preferred, a variety of materials may be used. Cost, disposability and length of support time are used to determine the optimum material. Circular retaining or support lip 45 on the sacks engage with the contoured circular openings 50 in the support trays 46 as shown in FIGS. 5A-C.

Figures 5A, 5B, 5C, 6:
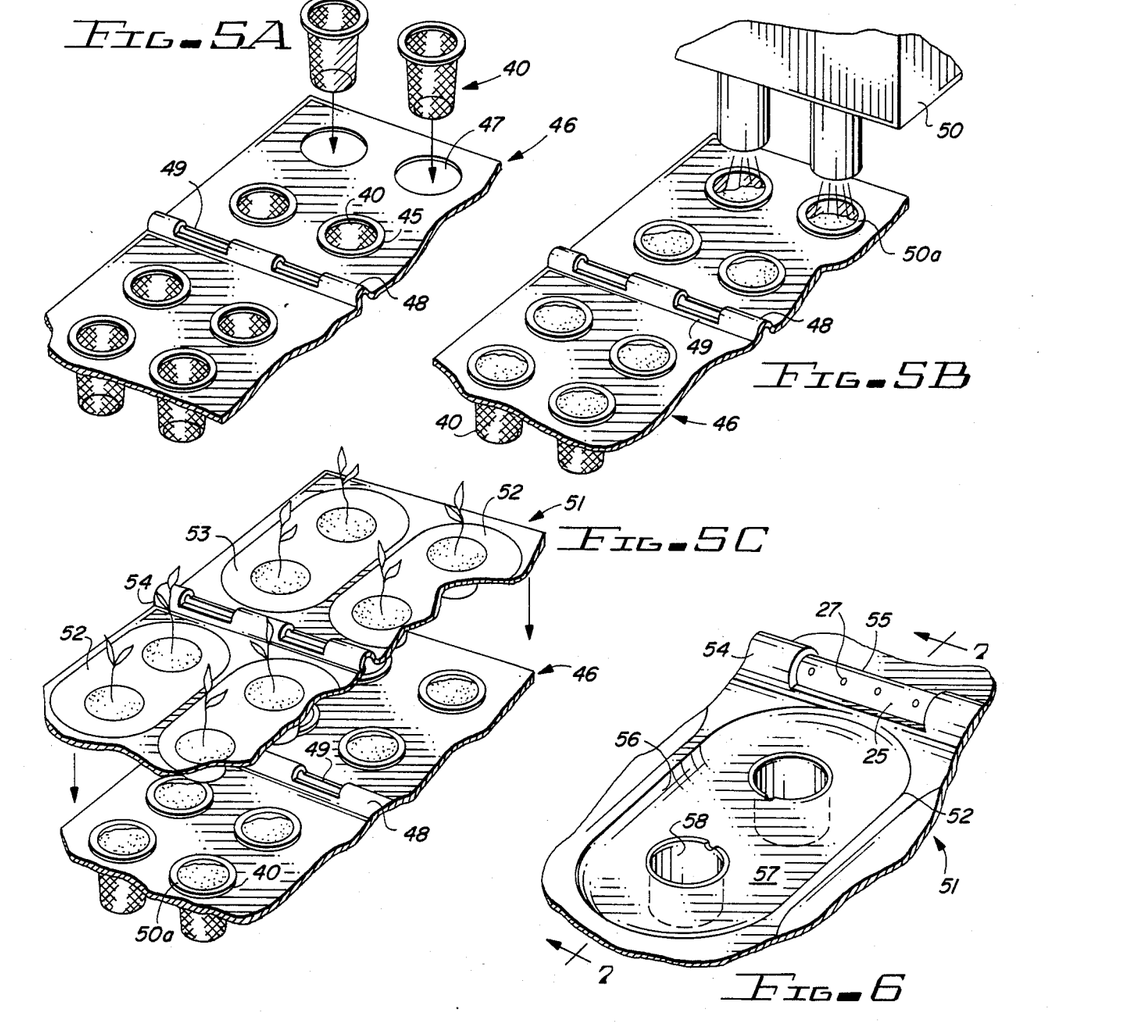
FIG. 5A is a perspective view, partially exploded, of a support tray holding root cups.
FIG. 5B is a perspective view of a plant support tray holding root cups filled with solid medium.
FIG. 5C is a perspective exploded view of a plant tray holding seedling starter blocks positioned above a support tray.
FIG. 6 is an enlarged perspective plant tray partially in phantom and cut away.
Figure 7:
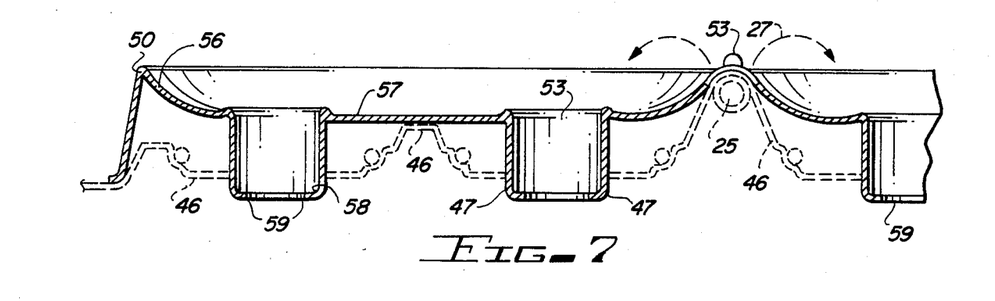
FIG. 7 is a cross-sectional view of the starter tray taken along lines 7—7 of FIG. 6 with a support tray shown in phantom.

The plant tray and support tray system in which the plants are housed during the growing cycle are best shown in FIGS. 5, 6 and 7. Support tray 46 is placed on top of the feeder tubes 25 with its weight being borne by support bars or brackets 37 (FIG. 2B). The body of the support tray is preferably flat, although its general contour is not critical, but it is interruptedly channeled to match the spray tubes that periodically run their tube length under the tray. The support tray channels 48 are interrupted by ports 49 adapted to expose the spray tube orifices and allow free discharge of liquid onto the upper surface of the tray. Root cup holes 47, preferably circular, are spaced over the tray surface and are adapted to receive, if desired, root cups or sacks 40 which are suspended by support lips 45. The lip of a root cup or sack should be of suitable size to allow suspension of medium and roots of a plant during growth but be easily detachable by downward pressure to cause fall of the cup at the time of harvest onto the trough placed therebelow. Because the tray 46 has the primary functions of supporting a plant tray 51 above it and supportably receiving root cups or sacks 40, its overall shape and contour are unimportant so long as the structure is compatable with the other components of the system and cooperate therewith. Ridging, waffling or banding for strength may be desirable when larger crops are being grown.

FIG. 5B illustrates the filling of root cups 40 positioned in support tray 46 being filled with solid growth medium 50a by growth media dispenser 50. In the case of root crops such as carrots, potatoes, beets or bulb ornamentals, it is often desirable for the sake of quality and yield to grow the plants in solid media such as sand, gravel, sawdust, plastic granules or vermiculite. These media ordinarily have no nutrient value themselves but serve to house plant roots, support the developing crop and serve as a sponge to keep the nutrient solution in contact with the roots for a longer time while allowing oxygenation.

The use of very light medium is highly advantageous when using the harvest flood system. A light, synthetic medium such as expanded polystyrene beads in the root sacks aids in floating the root crop at harvest time. High flotation results in better plant movement along the return troughs and the use of less flood water which is particularly important in areas where water is scarce.

FIG. 5C in exploded form shows a plant tray 51 loaded with seedling starter blocks 53 positioned above support tray 46. The upper tray contains a series of holes adapted to carry seedling starter blocks 53 in detachable cups or sockets 58 (FIGS. 6 and 7) which house the blocks. The plant tray has a matching interrupted feeder tube channel 54 extending its width which orients it on the corresponding channel 48 of the support tray 46. The channel port or ports 55 match the ports of the support tray channels 49 to allow exposure of the spray or drip outlets 27.

As best shown in FIG. 6, the plant tray is provided with depressed pockets formed by concave sidewalls 56 descending to depressed floor 57 which houses the open bottomed starter block sockets 58. In place and during use, the liquid expelled from the spray tubes falls into the depressions and is funnelled into the plant sockets.

While the number of orifices 27 in the feeder tubes 25 are not critical, in order to maintain equalized nutrient flow to each plant, it is important to maintain all flow pathways clear of blockage and free flowing. Removal of debris such as plant roots, leaves or pieces of media is primarily accomplished by adequate solution filtering. However, in the rare event that debris enters the feeder tube and blocks a feeder orifice, it is most desirable to have multiple remaining outlets which continue to supply solution to a plant.

FIG. 7 depicts in cross-section a support tray 46 positioned on spray tube 25 and nested under plant tray 51. The plant tray is provided with sockets 58 having annular bottom lips 59 which are of sufficient width to retain a starter block or a developing plant but narrow enough to allow the block or developed plant in it to be easily removed by downward pressure from a hand or automated harvesting device. The matching annular orifices 47 shown without root sacks in FIG. 7 accommodate the sockets 58 inserted or permanently formed therein. If root sacks are inserted into the support trays, roots of the developing plants descend through the open bottom of socket 58 and into the rock sack. If sacks are not used, the roots descend suspended in air below the trays and if they develop to a sufficient size, the root masses will be supported on the flexible troughs 32 which collect and remove nutrient solution or flood water.

In FIG. 6, details of the suspension pole bracket, support system and alternative rails to carry automated tractor assemblies are shown.

Figures 8, 9, 10, 11:
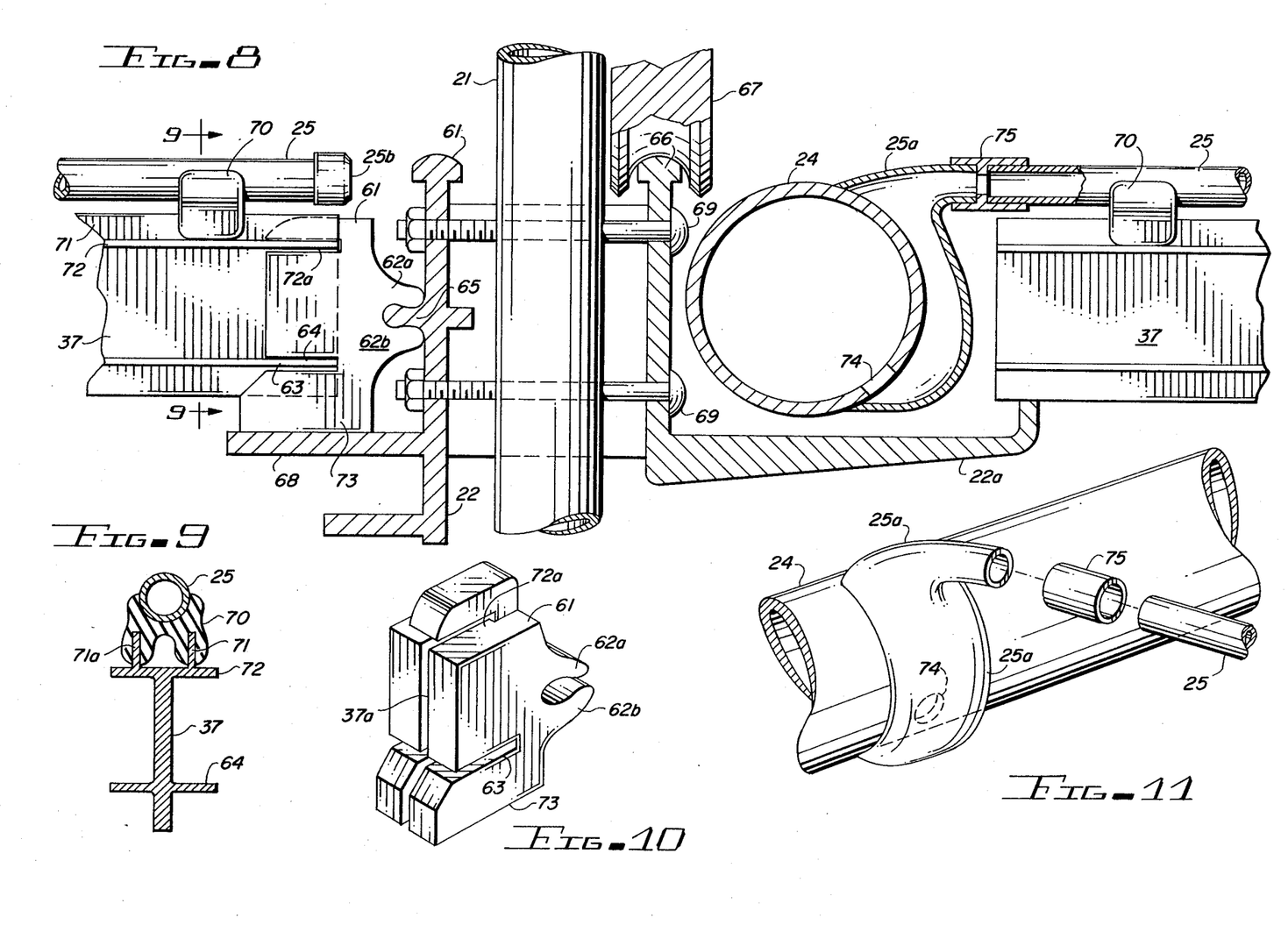
FIG. 8 is an enlarged and detailed view of sector 8 of FIG. 2B.
FIG. 9 is a section view of a support bar and feeder tube taken substantially along line 9—9 of FIG. 8.
FIG. 10 is a perspective view of a bracket anchor.
FIG. 11 is a perspective exploded view of the feeder tube attachment to a subheader.

Support bracket 22 and subheader support bracket 22a are fixed on suspension pole 21 by bracket bolts 69. Preferably, track rails 66 are mounted in parallel and horizontal relationship to each other across the hydroponic field. Support bracket 22 is provided with snap-tab tongue 65 and bracket support ledge 68 which supports bracket anchor assembly 61 which in turn is fastened to feeder tubes support bar 37. Support bar 37 is fashioned with bracket tongue 64 and ledge 72 which are adapted to mate with anchor 61. Bar 37 is fitted with fin 71 upon which is mounted feeder tube cradle 70 that supports tube 25 having end cap 25a.

On the subheader support side of FIG. 8 bracket 22a is mitered to support the proximal end of feeder tube bar 37. Subheader 24 shown in cross-section is nested over bracket 22a and is connected to feeder tube 25b end collar 25a in liquid-tight communication by collar joint 75.

Brackets 22 and 22a are adapted to terminate at their upper portions in track rails 66, either flat or cogged, which may carry flanged assembly 67.

FIG. 9 shows in greater detail and cross-section the support bar construction. Bar 37 has bracket ledge 72 with fins 71 and 71a upon which is mounted cradle 70 which supports feeder tube 25. At its lower end, the support bar carries bracket tongue 64. FIG. 10 shows details of bracket anchor 61. the pocket formed by upper lip 62a and lower lip 62b engages bracket tongue 65 of FIG. 8. Anchor support member 73 bears on bracket support ledge 68 to hold the distal end of support bar 37.

Bracket tongue 64 fits into anchor slot 63 while the main member of support bar 37 fits into support bar groove 37a while bracket ledge 72 mates with ledge slot 72a.

In FIG. 11, discharge port 74 offers liquid communication from subheader 24 to feeder tube end collar 25a joined to feeder tube 25 by collar joint 75.

The ancillary harvest flood tube assembly elements 34 and 35 of FIG. 1 may be used at harvest time to remove crop materials and root sacks. The nutrient reservoir port is closed during this operation so that flood water does not dilute the materials, cause spillage of it from overflow, or wash extraneous matter such as solid medium and plant materials including root pieces into the reservoir.

Water is pumped through the flood tubes 24 to the high end of all return troughs 32 at stubs 25. Plants and/or root sacks are pushed through the support trays to fall into the running water stream down each trough and are carried along to the central trough 33 and to convenient points for retrieval.

Small root crop plants such as carrots or scallions are cultured according to the following example. Seeds are planted in cylindrical starter blocks composed of, for example, peat moss or synthetic fibers, and preferably housed in seedling trays, and sprouted to transplant size. Roots sacks are dropped into openings in the support trays and filled with solid medium to support the plant roots. Plant trays containing seedlings in the starter blocks, or single plants separated from one another in propagation medium are inserted into the sockets of the plant trays. The plant trays with seedlings are placed on the support trays which are aligned by mating contours including the spray tube upstanding channels transversing a width of the two trays. Nutrient solution is periodically pumped from the reservoir around the system and the excess retrieved by gravity back through the center trough to the reservoir. To harvest mature plants, the above ground portions may be cut and removed. Downward pressure is applied by simple rod devices, an appropriate instrument carried on the robot tractor, the operator's hand, etc. to push the material through the plant tray. The plant trays are then removed and stored or prepared for the next growth cycle. Root sacks, topped with the plant stub and starter block are then thrust through the support tray openings, falling in to the return trough below. The reservoir port is closed and the troughs are flooded with water, the stream carrying root sacks, medium and crop materials to the low end of the trough for collection.

Construction and maintenance are simple because of the design features of the hydroponic system. A limited number of components form standard unitary sections of the total assembly. The basic structure is preferably supported on a network of poles to which are affixed support bars, or in the case of a rail track and tractor system, combination rail/support bars. Depending on the total weight requirements, the poles may be formed of steel, aluminum or plastic tubing. In the typical arrangement, rigid aluminum alloy is preferred for fabrication of the bars and the poles. Trough support strips below the support bars are preferably stamped from strip metal stock or molded from plastic. Hooks of metal or plastic support the troughs which have grommets to engage the hooks. Friction clamps can be employed to simplify production of the troughs by eliminating the grommets but the cost is usually greater. Brackets may be made of any suitable material but extruded aluminum bar utilizing molded plastic connectors which can be snapped into locking engagement are preferred. Likewise, the cradles or lips holding the feeder tubes are advantageously formed of plastic, particularly polypropylene or medium durometer polyvinylchloride.

The entire bed support structure lies in a single plane that is sloped at a shallow drainage grade, preferably of 1 to 3 percent. Return troughs are best formed from plastic such as polyethylene or waterproof fabric. While rigid troughs are comtemplated, their incorporation requires greater skill, time and dictates closer tolerances in assembling which is not desirable. Air ducts are formed of similar materials to the troughs and are installed in similar fashion. However they should be slightly wider than trough sheets in order to droop lower and thereby form a tunnel-like cavity in conjunction with the troughs. Another difference is that it is preferable to hook the air duct sheets loosely, compared to the taut margins of the troughs from hook to hook. The looseness forms small folds or openings that permit flow of air and carbon dioxide from the tunnel to the plant leaves.

The main header, sub-headers and feeder tubes are preferably constructed of conventional material such as rigid polyvinylchloride or polyester resin. Consideration should be given to materials that are low in extractable contaminants such as heavy metal plasticizers which are deleterious to the plants. Nozzles and fittings can be formed from conventional plastic fittings which can be glued or ultrasonically welded in place. Many of the couplings can be formed simply by using segments of flexible rubber tubing.

Plant and support trays are preferably of light gauge molded rigid plastic, preferably molded to configurations that lend themselves to thermal vacuum forming or fiberglass buildup. While the support trays are normally designed to be a permanent part of the structure and carry ancillary components such as indexing markers, such as integrally molded tabs to control cultivating, planting and harvesting functions of a robot tractor, and should be durable, the plant trays can be of variable strength. Economically disposable trays may be very thin, 0.1 to 0.7 mm for example, while stronger and heavier reusable units may be 1.0 mm or thicker. Concave depressions around the starter block sockets, peripheral ridges and the spray tube channels serve to give greater strength to the plant trays. Support trays of molded rigid plastic are typically at least 1.0 mm thick over their flattened horizontal portions.

An important design consideration in hydroponic systems is reduction of light on plant roots and nutrient solutions to inhibit algae growth. In the assembly of this invention, roots and return troughs are blocked from overhead light by the plant and support trays. If algae growth should become a problem on top surfaces of plant trays where nutrient solution collects and is fed to plant centers, a shade tray can be incorporated. Preferably a lightweight plastic sheet covers the entire plant tray with a small hole formed over each socket for the plant to grow through. This expedient provides that the nutrient solution is exposed to no sunlight around the entire circuit.

Although preferred embodiments of the invention have been shown and described herein, it is to be understood that various modifications and substitutions may be made by those skilled in the art without departing from the novel spirit and scope of the invention.

THE INVENTION CLAIMED IS:
1. A hydroponic system comprising:
   a plurality of spaced-apart suspending poles set in a base material to support and define a field;
   a plurality of substantially parallel paired bars perpendicularly mounted on brackets vertically mounted between said bars and in parallel relationship to each other to form a substantially horizontal plane;
   nutrient solution conduit tubes located above and supported by said bars, said tubes communicating with a circulating solution source and terminating in spray tubes having an orifice for release of said solution, said spray tubes supported on said brackets;

a plant support tray suspended on the spray tubes and interruptedly channelled to expose spray tube orifices located along the tube length, said tray having a floor positioned to receive solution emitted by the spray tubes, said tray floor carrying a plurality of openings adapted to carry a plurality of liquid-porous root sacks extending therebelow;

a flume channel located below said tray and substantially coextensive in length thereto positioned to receive solution released from said root sacks and carry the solution to a central flume whereby the solution is returned to the circulating source; and a central solution reservoir to receive solution draining from the central flume, said reservoir having a circulating solution communicating with said spray tubes.

2. The hydroponic system of claim 1 additionally comprising a seedling tray positioned above said plant support tray and carried on the channels supported by the spray tubes, said tray having a substantially concave cross-section to receive solution emitted from the spray tubes and having a floor with depending sockets adapted to house seedling blocks.

3. The system of claim 2 wherein said seedling tray sockets are placed in vertical alignment above said root sack openings of the support tray.

4. The system of claim 3 wherein each of said sockets have an open bottom defined by a retaining lip suitable to hold seed blocks and adapted to allow plant growth to descend from said open bottoms and to be received by the root sacks.

5. The system of claim 1 wherein the said bars and rails form a ladder assembly supported from the brackets.

6. The system of claim 1 wherein said bars and said brackets are joined by a snap friction fit comprising a snap tab on one of the members mated with a pair of opposing lips on the opposite member.

7. The system of claim 1 wherein the brackets attached to said poles carry a rail track adapted to support flanged railroad wheels.

8. The system of claim 1 additionally comprising a fluid duct formed on its upper surface by said flume channel and on its lower surface by a draped flexible sheet sealed at the edges by attachment to said poles to the coextensive edges of said flume channel, said sheet being capable of conducting carbon-dioxide enriched air.

9. A hydroponic automated system comprising:

an array of perpendicular spaced poles defining a crop bed;

paired parallel support bars attached to said poles at a predetermined height to define a uniform horizontal plane;

brackets vertically positioned on said bars in substantially parallel arrangement to each other;

a nutrient solution liquid reservoir located in close proximity to the field;

a main header conduit communicating with said reservoir and subheader solution conduits, spray tubes communicating with said subheaders, the spray tubes having orifices for emission of the solution and being substantially coextensive with and supported on said brackets;

pump means proximate to said reservoir to urge said solution from the reservoir to the spray tubes;

plant trays having a generally concave sidewall, a floor and channels adapted to be supported over the length of the spray tubes, said channels being interrupted to expose the tube orifices, and said floor having depending sockets each with an open bottom and a peripheral retaining lip suitable for holding a seedling block, the trays positioned to receive emmissions of the spray tubes;

support trays positioned under the plant trays and having channels mating with those of said plant trays and positioned over the spray tubes, said channels having ports to expose the tube orifices, said support tray having a floor from which depends liquid-porous root sacks that vertically match the sockets of said plant trays;

flexible sheet flumes attached to poles positioned below the root sacks so as to receive solution passing therefrom;

a central trough positioned to receive solution flowing from the flumes and to discharge the solution into the reservoir.

10. A hydroponic tray assembly adapted to house growing plants comprising:

a support tray having a substantially straight upstanding channel traversing a horizontal dimension of said tray, said tray having a plurality of orifices to receive plant roots therethrough;

a plant tray adapted to nest on and cooperate with said support tray, said plant tray having a plurality of sockets having annular bottom lips and open bottoms, and further having depressed pockets formed by concave sidewalls descending to a tray floor, the pockets surrounding the sockets and adapted to direct liquid contacting the tray into the sockets;

and the sockets and said channel of the plant tray mating with the channel and the orifices of the support tray.

11. The assembly of claim 10 wherein the channel of each tray is provided with open ports;

and said support tray channel housing a nutrient solution spray tube having liquid supplying orifices exposed within said ports of the channels whereby liquid flowing therefrom is directed into the sockets of the plant tray.

* * * * *